United States Patent
Stagg et al.

(10) Patent No.: US 7,168,922 B2
(45) Date of Patent: Jan. 30, 2007

(54) PLASTIC FANS HAVING IMPROVED FAN RING WELD LINE STRENGTH

(75) Inventors: Jonathan B. Stagg, Bellevue, MI (US); Donald E. Buckley, Eaton Rapids, MI (US)

(73) Assignee: BorgWarner Inc., Auburn Hills, MI (US)

( * ) Notice: Subject to any disclaimer, the term of this patent is extended or adjusted under 35 U.S.C. 154(b) by 137 days.

(21) Appl. No.: 10/831,789

(22) Filed: Apr. 26, 2004

(65) Prior Publication Data

US 2005/0238486 A1 Oct. 27, 2005

(51) Int. Cl.
*F04D 19/00* (2006.01)

(52) U.S. Cl. .................. 416/169 A; 416/195; 416/234; 415/915

(58) Field of Classification Search ........... 264/328.12; 416/169 A, 195, 196 R, 2, 196 A, 234; 415/915
See application file for complete search history.

(56) References Cited

U.S. PATENT DOCUMENTS

| | | | |
|---|---|---|---|
| 4,671,739 A | 6/1987 | Read et al. | |
| 5,076,760 A | 12/1991 | Weetman et al. | |
| 5,346,659 A | 9/1994 | Buhler et al. | |
| 5,454,695 A | 10/1995 | Shah et al. | |
| 5,611,668 A | 3/1997 | Yapp et al. | |
| 5,833,913 A * | 11/1998 | Ellwood et al. | 264/328.12 |
| 5,948,340 A * | 9/1999 | Terada et al. | 264/328.12 |
| 5,971,709 A | 10/1999 | Hauser | |
| 6,200,098 B1 | 3/2001 | Kennedy et al. | |
| 6,375,427 B1 | 4/2002 | Williams et al. | |
| 6,565,320 B1 | 5/2003 | Surls et al. | |
| 6,596,370 B2 | 7/2003 | Hyuga et al. | |

FOREIGN PATENT DOCUMENTS

| | | |
|---|---|---|
| EP | 1 122 864 A2 | 8/2001 |
| JP | 57 191494 | 11/1982 |
| JP | 62279297 | 12/1987 |
| JP | 07205241 | 8/1995 |
| JP | 10000627 | 1/1998 |
| JP | 2003094494 | 4/2003 |
| JP | 2003094494 A * | 4/2003 |
| JP | 2003154550 | 5/2003 |
| WO | WO 01/24986 A1 | 4/2001 |

* cited by examiner

*Primary Examiner*—Richard A. Edgar
(74) *Attorney, Agent, or Firm*—Greg Dziegielewski; Artz & Artz, P.C.

(57) ABSTRACT

A method to influence material flow during the injection molding of thermoplastic, polymeric ring type fans such that a major portion of the materials flowing in opposite directions preferably flow past one another, or collide at an angle relative to one another, rather than colliding at an 180 degree angle relative to each other to form weld lines. This flow bypassing results in better material mixing or integrating than merely allowing flow fronts to collide and cool. In one embodiment, a portion of the fan's ring is thickened in the weld line area to minimize the amount of material colliding at a 180-degree angle relative to each. Alternatively, at least one appendage could be added to the ring fan that will influence the material flow during molding conditions. Each appendage will be removed prior to introducing the ring fan to a cooling system.

3 Claims, 4 Drawing Sheets

PLASTIC FANS HAVING IMPROVED FAN RING WELD LINE STRENGTH

TECHNICAL FIELD

The invention relates generally to fan drive systems and more specifically to plastic fans having improved fan ring weld line strength.

BACKGROUND ART

The present invention concerns cooling fans, such as fans driven by and for use in cooling an industrial or automotive engine. More particularly, certain aspects of the invention relate to a ring fan, while other features concern fan blade design.

In most industrial and automotive engine applications, an engine-driven cooling fan is utilized to draw air through a coolant radiator. Usually, the fan is driven through a belt-drive mechanism connected to the engine crankshaft.

A typical cooling fan includes a plurality of blades mounted to a central hub plate. The hub plate can be configured to provide a rotary connection to the belt drive mechanism, for example. The size and number of fan blades is determined by the cooling requirements for the particular application. For instance, a small automotive fan may only require four blades having a diameter of only 9". In larger applications, a greater number of blades is required. In one typical heavy-duty automotive application, nine blades are included in the fan design, the blades having an outer diameter of 704 mm.

In addition to the number and diameter of blades, the cooling capacity of a particular fan is also governed by the airflow volume that can be generated by the fan at its operating speed. This airflow volume is dependent upon the particular blade geometry, such as the blade area and curvature or profile, and the rotational speed of the fan.

As the cooling fan dimensions and airflow capacity increase, the loads experienced by the fan, and particularly the blades, also increase. In addition, higher rotational speeds and increased airflow through the fan can lead to de-pitching of the blades and significant noise problems. In order to address these problems to some degree, certain cooling fan designs incorporate a ring around the circumference of the fan. Specifically, the blade tips are attached to the ring, which provides stability to the blade tips. The ring also helps reduce vortex shedding at the blade tip, particularly when the ring is combined with a U-shaped shroud that follows the circumference of the ring.

The ring fan design, therefore, eliminates some of the structural difficulties encountered with prior unsupported cooling fan configurations. However, with the increased strength and improved vibration characteristics provided by the ring fan, the nominal operating conditions for these fans have been increased to again push the envelope of the ring fan's capability. Moreover, the mass inertia of the circumferential ring increases the centripetal force exerted on the blade-ring interface.

Consequently, a need has again developed for ways to improve cooling airflow capacity of ring fans, while at the same time increasing their strength. This need becomes particularly acute as the operational rotational speeds of the fan increase to meet the increasing cooling demands for large industrial and automotive engines.

SUMMARY OF THE INVENTION

The present invention relates to a method to influence material flow during the injection molding of polymeric, and more preferably thermoplastic polymeric ring type fans such that a major portion of the material flowing in opposite directions during formation preferably flow past one another, or collide at an angle relative to one another, rather than colliding at an 180 degree angle relative to each other, along weld lines (also known as knit lines). This flow bypassing results in better material mixing or integrating than merely allowing flow fronts to collide and cool.

The present invention proposes two distinct methods for achieving this result. In one method, a portion of the fan's ring near the weld line is thickened, thus allowing the molten raw material to flow past, or swirl, in the area of the weld line to minimize the amount of material colliding at this portion.

Alternatively, one or more appendages could be added to the outer ring of the ring fan at a position near the weld line that influence the material flow during molding conditions. The appendages are removed prior to introducing the ring fan to a cooling system.

The present invention itself, together with attendant advantages, will be best understood by reference to the following detailed description, taken in conjunction with the accompanying figures.

BEST MODE(S) FOR CARRYING OUT THE INVENTION

Figure 1:
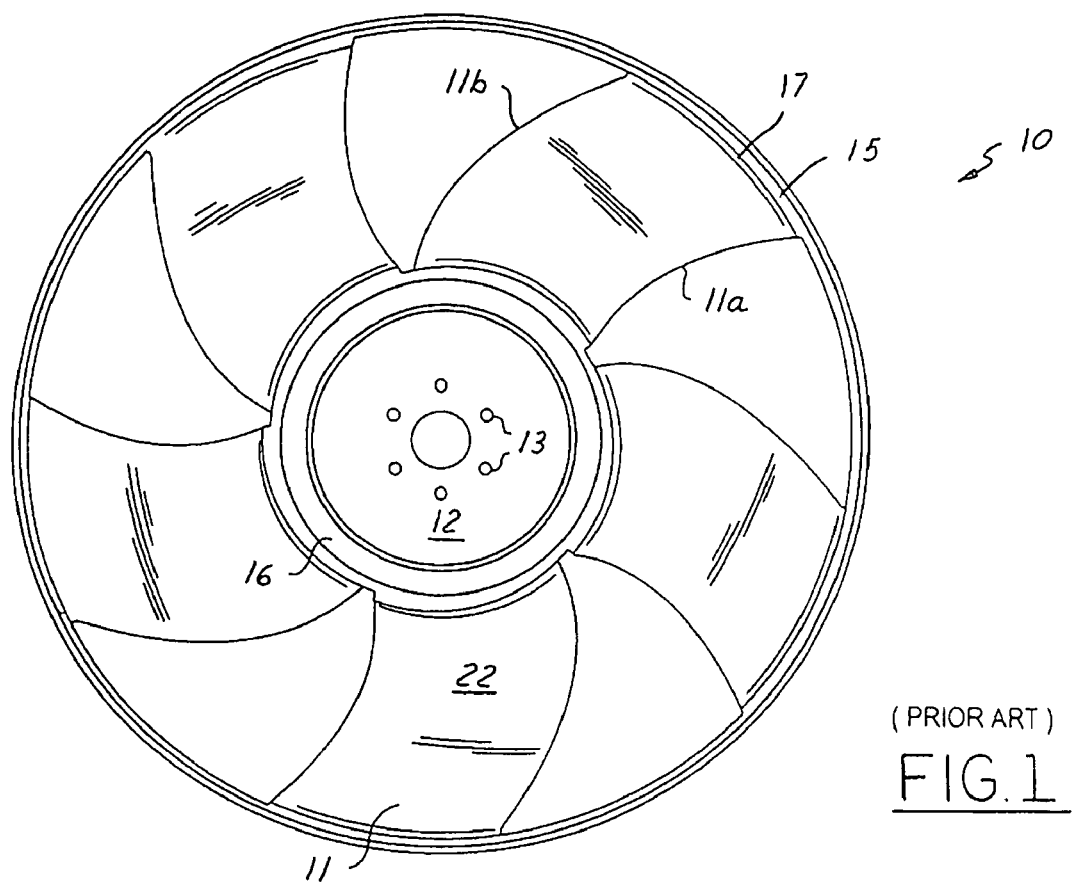
FIG. 1 illustrates a ring fan according to the prior art.

For the purposes of promoting an understanding of the principles of the invention, reference will now be made to the embodiments illustrated in the drawings and specific language will be used to describe the same. It will nevertheless be understood that no limitation of the scope of the invention is thereby intended. The inventions include any alterations and further modifications in the illustrated devices and described methods and further applications of the principles of the invention which would normally occur to one skilled in the art to which the invention relates.

Figure 2:
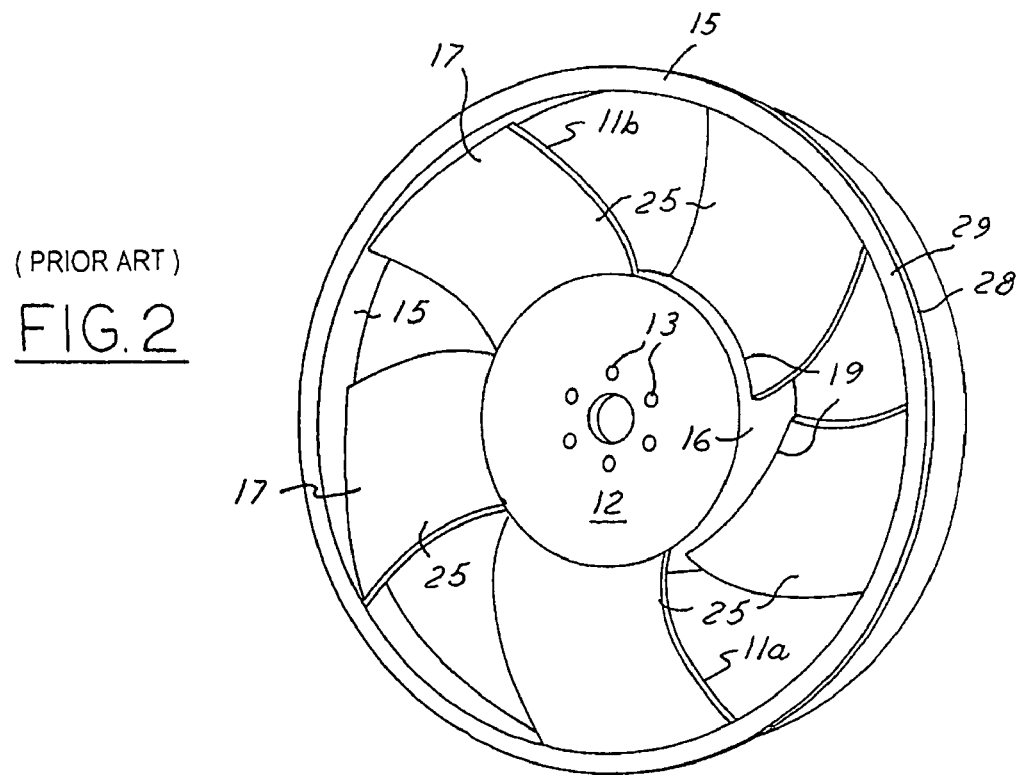
FIG. 2 is a rear perspective view of the ring fan as depicted in FIG. 1.

Referring now to FIGS. 1 and 2, a typical ring fan 10 according to the prior art includes a number of blades 11 mounted to a central hub plate 12. As shown in FIG. 1, the hub plate 12 can include a mounting bolt ring 13 configured to mount the fan to a fan drive assembly of known design. The fan 10 further includes an outer ring 15 fixed to the blade tips 17 of each of the fan blades 11 and an inner ring 16 fixed to the root 19 of each of the blades 11. The inner ring 16, outer ring 15 and blades 11 are preferably formed of a high strength moldable polymer material that is preferably injection molded about the metallic hub plate 12 in a conventional known process. Typical plastics used include polyamides (such as Nylon 6 and nylons under the trade name Zytel® Nytel) or polypropylenes. These plastics are typically reinforced with between about 15 and 50%, and more preferably 15 and 30%, fiber reinforcement. The fiber reinforcement is typically in the form of short glass fibers, although long glass fibers may also be used.

Each of the blades 11 includes a front face 22 that is at the effective inlet to the ring fan 10. Likewise, each blade includes an opposite rear face 25 (see FIG. 2) on the backside of the ring fan. In the preferred embodiment, five blades 11 can be provided, each having a substantially uniform thickness from the blade root 19 to the blade tip 17. In an alternative embodiment, each of the blades 11 can vary in thickness from the leading edge 11a to the trailing edge 11b of the blade. Each blade 11 preferably follows an air foil-type configuration adapted to provide maximum airflow when the ring fan 10 is operated within its standard rotational speed operational range and within its intended range of system restriction.

In referring to FIG. 2, it can be seen that the outer ring 15 of the fan 10 includes a flared rim 28, disposed generally at the output face of the fan. The flared rim 28 defines a radially outwardly flared surface 29 that follows a gradual curvature away from the tips 17 of each of the blades 11. The fan 10 defines an inlet side at the leading edges 11a of the fan blades, and an opposite outlet side at the trailing edges 11b. The flared rim 28 of the outer ring 15 is disposed at the outlet side of the fan 10.

Figure 3:
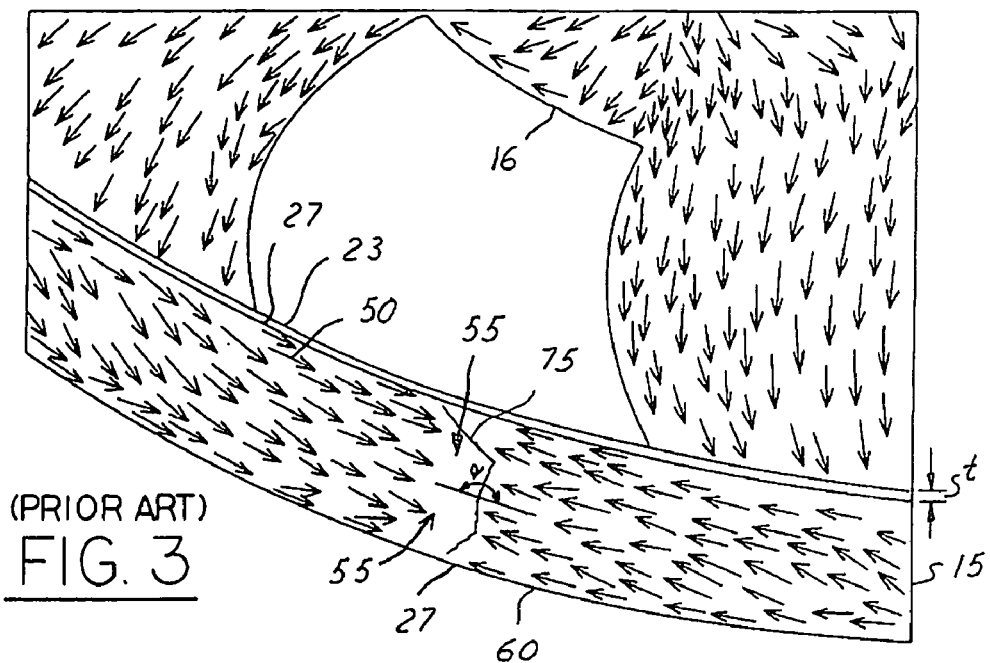
FIG. 3 is a close-up and enhanced illustration of the molten raw material flow through the outer ring of FIG. 1 during molding conditions.

FIG. 3 shows a close-up and enhanced view of the outer ring 15 of the ring fan 10 according to the prior art that illustrates the flow fronts 50, 60 of melted (i.e. molten) raw material used to form the outer ring 15 in a conventional molding process.

In this process, raw material, in molten form, is introduced under pressure through gates formed in the mold at a position corresponding to the inner ring 16 near the respective root 19. For plastic fans 10 formed from the polyamides as described above in FIGS. 1 and 2, the molten, fiber containing polyamide (i.e. the raw material) is injected through the gates at between about 218 and 226 degrees Celsius (424 to 439 degrees Fahrenheit) in presses with capacities between about 500 tons and 1,500 tons of pressure. The gates contained within the mold generally range for about 1 to 4 mm in diameter (0.039 inches to about 0.157 inches). The raw material is allowed to cool within the mold to form a hard plastic, and the mold is opened to release the formed fan 10.

As the raw material is injected within the mold cavity, the molten raw material flows along a path of least resistance. One portion of the raw material thus forms the inner ring 16. Another portion of the molten raw material, represented by flow fronts 50 and 60 from two adjacent gates, flow from the respective gates, through the adjacent blades 11 from root 19 to tip 17, and into the outer ring 15 to form the outer ring 15. The flow fronts 50, 60 travel within the outer ring 15 from the tip 17 towards a middle area approximately equidistant from the tip 17 of each blade 11 and approximately parallel with respect to each other and with respect to the inner circumference 23 and outer circumference 27 of the outer ring 15. The flow fronts 50, 60 meet and freeze (i.e. the flow fronts 50, 60 collide directly into one another) along a fairly planar region 55 that is nearly perpendicular to the tangential alignment of the ring fan 10 structure (the planar region 55 runs perpendicular to a tangent of the inner circumference 23 and outer circumference 27 of the outer ring 15 within this middle area). In other words, flow fronts 50, 60 define an angle α of about 180 degrees relative to each other, wherein the thickness t of the outer ring 15 is constant along its length and width from the tip region to the middle region. The meeting and freezing of flow fronts 50, 60 create a weld line 75 (also known as knit line) in the outer ring 15 between each respective adjacent pair of blades 11. As one of ordinary skill recognizes, these weld lines 75 typically represent the weakest part of the outer ring 15 relative to centrifugally-induced bending stresses.

While part geometry can affect the shape of the knit line 75, generally knit lines are quite linear and run axially along the outer ring 15 roughly midway between adjacent blade tips 17 and perpendicular to the tangent defining both the inner circumference 23 and outer circumference 27 of the outer ring 15.

Figure 4:
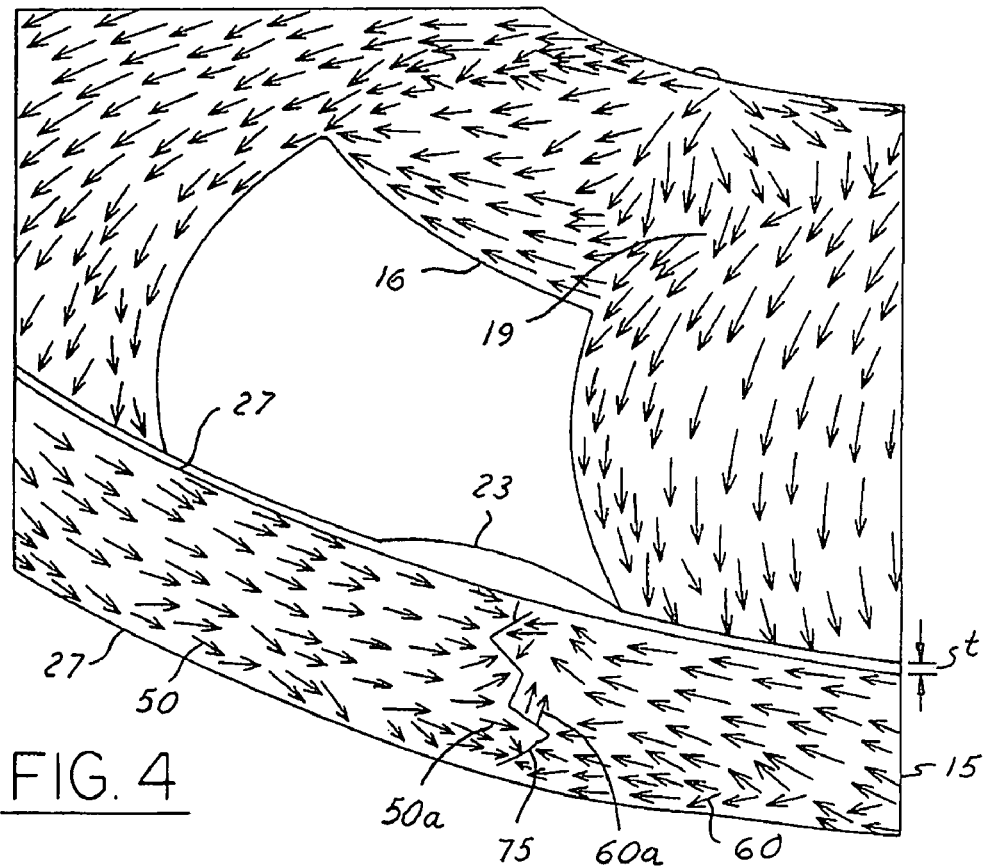
FIG. 4 is a close-up and enhanced illustration of the molten raw material flow through the outer ring during molding conditions of a ring fan according to one preferred embodiment of the present invention.
Figure 5:
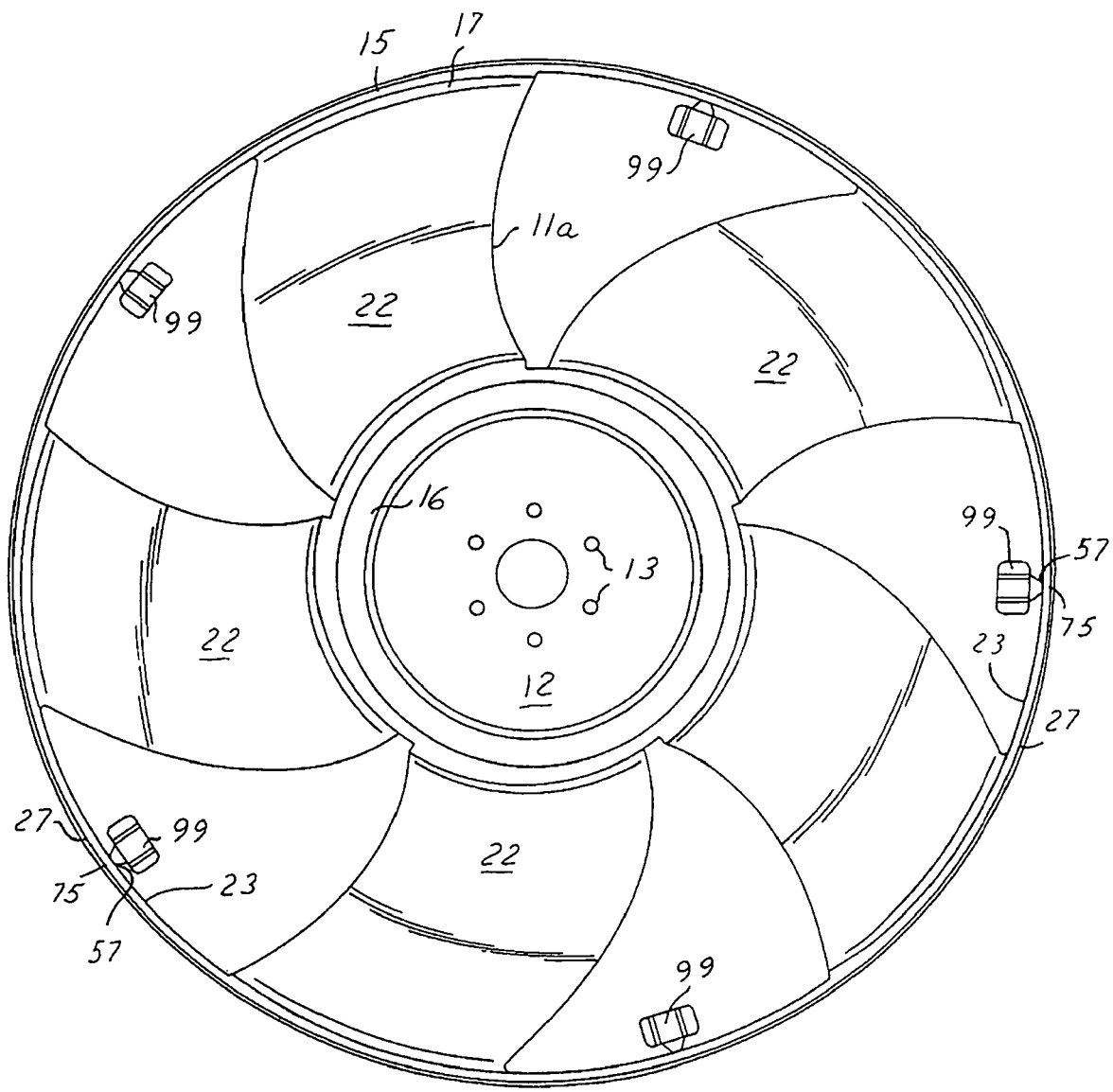
FIG. 5 is a close-up plan view of a ring fan having a plurality of removable appendages according to another preferred embodiment of the present invention.

FIGS. 4 and 5 illustrate two preferred methods for improving the strength of the ring fan 10 at these various weld lines. In FIG. 4, the raw material flow 50, 60 are redirected by varying the thickness t of the outer ring 15 along portions of its length and width from the tip region to the middle region. Less material from flow fronts 50, 60 therefore collide and freeze along the planar region 55 (as in FIG. 3), which results in a stronger weld line. In other words, a portion of flow front 50 collides with a portion of flow front 60 at an angle α (as in FIG. 3) less than about 180 degrees. In FIG. 5, the weld line as shown in FIG. 3 is effectively removed or reduced by introducing one or more appendages 99 at or near the area where weld lines occur through which the material flows instead of colliding. These appendages are subsequently removed prior to coupling the fan 10 to a fan drive. Each is described in further detail below.

Referring now to FIG. 4, one method for redirecting the flow fronts 50 is accomplished by simply increasing the thickness t of the outer ring 15 at a middle position 57 near or corresponding to the weld line 75. This causes at least a portion 50a, 60a of the respective flow fronts 50, 60 (as in FIG. 3) to meet an angle relative to each other at the weld line 75, rather than meeting and freezing along the planar region 55 (as in FIG. 3) that is nearly perpendicular to the tangential alignment of the outer ring 15.

Referring now to FIG. 5, another method for altering the weld line 75 is to introduce an appendage 99 at a position 57 near the weld line 75 and within the planar region 55 (as in FIG. 3). In FIG. 5, the appendage 99 is shown coupled along the inner circumference 23 of the outer ring 15. The material from flow fronts 50 and 60 (as in FIG. 3) will preferentially flow into the appendage 99 as opposed to meeting and freezing along the planar region 55 that is nearly perpendicular to the tangential alignment (i.e. along the length) of the outer ring 15. In this way, weld lines are minimized or otherwise removed from the outer ring 15, and instead are formed in the appendage 99. After the flow material cools and the mold is removed, the appendage 99 is easily removed by simply twisting clockwise or counterclockwise, therein breaking the appendage away from the outer ring 15 at position 57.

Further, the introduction of the appendage 99 has the added advantage of providing a location in which to purge out trapped gas within the mold. It also provides a location in which mold release residue and other impurities, such as oxidized residue, may be collected during the molding process.

While one appendage 99 is shown being located along the inner circumference 23 of the outer ring 15 in FIG. 5, alternative preferred embodiments may locate the appendage 99 in other locations along the knit line 75. For instance, the appendage 99 may be formed along the outer circumference 27 of the outer ring or at a point midway between the inner circumference 25 and outer circumference 27. Further, in other preferred embodiments, multiple appendages 99 per knit line 75 may be formed during the molding process. Thus, for example, an embodiment may have one appendage 99 formed on the inner circumference 23 and another appendage 99 formed on the outer circumference 27 of each respective knit line 75 located about midway between an adjacent pair of blade tips 17. In other alternative preferred embodiments, the number of appendages 99 formed between one adjacent pair of blade tips 17 may be different from the number of appendages formed between another adjacent pair of blade tips 17.

Figure 6:
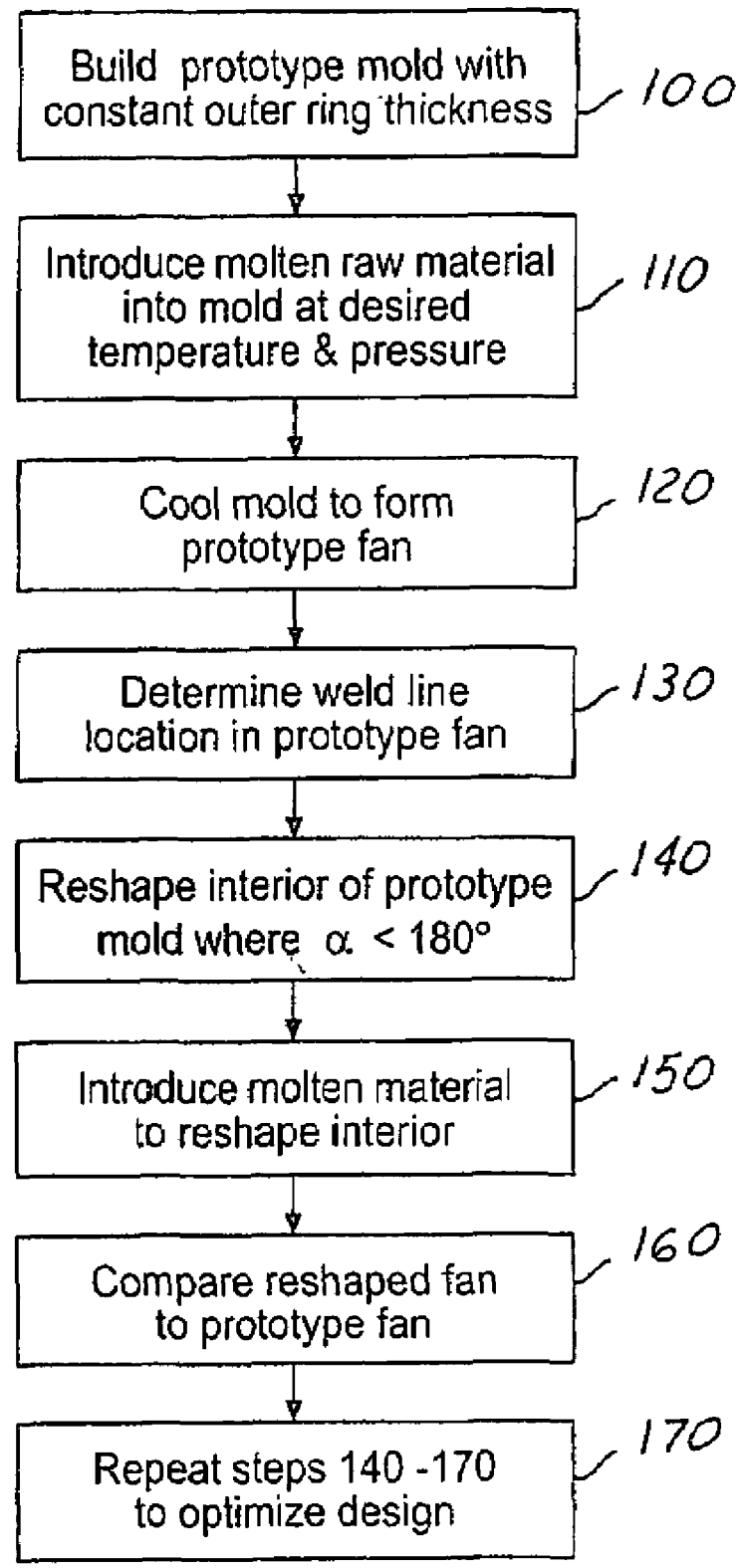
FIG. 6 is a logic flow diagram for forming the fan in accordance with the preferred embodiments of FIGS. 4 and 5.

In either of the preferred embodiments as described above in FIGS. 4 and 5, a preferred methodology for improving outer ring strength of a fan used in a fan drive system may be accomplished according to the following flow diagram as shown in FIG. 6. First, in step 100, a prototype mold is built for the fan having an interior corresponding to the size and shape of the fan. In this prototype mold, the thickness t of the outer ring 15 is held constant. Next, in step 110, a quantity of a molten raw material is introduced simultaneously through each of the plurality of gates and within said interior at a desired temperature and pressure. In step 120, the raw material is cooled within the prototype mold to form a prototype fan.

In Step 130, a location of a weld line 75 along the outer ring 15 between each adjacent pair of the plurality of fan blades 11 is determined. As described above, the weld line 75 corresponds to the weakest portion of the outer ring 15 of said prototype fan between the adjacent pair of the plurality of fan blades 11 and is formed at a position wherein a first flow front 50 of a portion of said quantity of molten raw material collides with a second flow front 60 of a second portion of said quantity of molten raw material. In a uniform thickness outer ring 15, under ideal molding conditions, the flow fronts 50, 60 collide directly into to each other (i.e. the angle formed between the two fronts 50, 60 approaches approximately 180 degrees).

Next, in Step 140, the interior of said prototype mold is reshaped such that the molding process forms a fan 10 in which a portion of the raw material flow of one flow front 50 collides with a portion of the raw material from a second flow front 60 at angle α that is less than about 180 degrees. In FIG. 4, this step is accomplished by increasing the thickness t of the outer ring 15 along portions of its length and width from the tip region to the middle region at or near the location of the weld line 75. In FIG. 5, this step is accomplished by introducing one or more appendages 99 in the planar region 55 along the outer ring 15 corresponding to each weld line.

In Step 150, a quantity of a molten raw material is introduced simultaneously through each of the plurality of gates and within said interior of the reshaped prototype at a desired temperature and pressure.

In Step 160, the strength of the reshaped prototype fan is compared with the strength of the prototype fan having a constant thickness throughout the outer ring 15.

Finally, if necessary, in Step 170, the prototype tool is reshaped and Steps 140–160 repeated in order to achieve an optimum desired strength of the outer ring 15.

While weld line 75 is shown formed on the outer ring 15 of FIG. 3, it is recognized that additional weld lines (not shown) may be formed in other areas of the ring fan 10 where flow fronts intersect. For example, raw material flow also intersects within the inner ring 16 between the gates as raw materials are injected simultaneously through the gates. Thus, the methods for improving weld line strength may be incorporated into other portions of ring fan not described herein.

The present invention thus describes two unique strategies for improving the strength of molded ring fans. This additional strength becomes particularly acute as the operational rotational speeds of the fan increase to meet the increasing cooling demands for large industrial and automotive engines.

Further, the methods described herein are equally applicable for the formation of any moldable plastic part in which molten raw material flow intersects during the molding process.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A method for improving outer ring strength of a fan used in a fan drive system, the fan having a plurality of fan blades coupled between the outer ring and an inner ring, the method comprising:

forming a prototype mold having an interior, said interior corresponding to the size and shape of the fan, wherein the thickness of the outer ring is constant, said mold having a plurality of gates located around the inner ring, one of the plurality of gates closely coupled to the inner ring at a position corresponding to one of the plurality of fan blades;

introducing to said prototype mold a quantity of a molten raw material simultaneously through each of the plurality of gates and within said interior at a desired temperature and pressure;

cooling said quantity of molten raw material within said prototype mold to form a prototype fan; and determining a location of a weld line along the outer ring between each respective adjacent pair of the plurality of fan blades within said prototype fan, said weld line corresponding to a weakest portion of the outer ring of said prototype fan between each respective adjacent pair of the plurality of fan blades, wherein said weakest portion of the outer ring is formed at a position wherein a first flow front of a portion of said quantity of molten raw material collides with a second flow front of a second portion of said quantity of molten raw material, said first flow front flowing substantially in a first direction along the outer ring from one of the adjacent pair of the plurality of fan blades towards an other of the adjacent pair of the plurality of fan blades and wherein said second flow front flowing substantially in a second direction along the outer ring from said other of said adjacent pair of the plurality of fan blades to said one of said adjacent pair of the plurality of fan blades, said first direction defining an angle α relative to said second direction, said angle α being approximately 180 degrees;

reshaping said interior of said prototype mold to form a mold such that the thickness of the outer ring between one of said respective adjacent pair of the plurality of fan blades is increased;

introducing to said mold a second quantity of a molten raw material simultaneously through each of the plurality of gates and within said interior at a desired temperature and pressure, wherein a third portion of said secon quantity of molten raw material flows between said one of said respective adjacent pair of the plurality of fan blades and said other of said respective adjacent paire of the plurality of fan blades in substantially a third direction and a fourth portion of said second quantity of molten raw material flows between said other of said respective adjacent pair of the plurality of fan blades and said one of said respective adjacent pair of tan blades in substantially a fourth direction, said third portion colliding with said fourth portion with the outer ring between said adjacent pair of the plurality of fan blades at a second angle, said second angle defined as the angle between said third direction and said fourth direction, said second angle being less than 180 degrees;

cooling said quantity of molten raw material within said mold to form the fan; and removing the fan from said mold, wherein reshaping said interior of said prototype mold comprises reshaping said interior such that the thickness of the outer ring increases substantially uniformly and gradually from each respective one of adjacent pair of blade tips of said plurality of fan blades toward a middle region.

2. The method of claim 1 further comprising:

comparing the strength of the outer ring of the mold with the strength of the outer ring of said prototype mold; and reshaping said interior of said mold until the strength of the outer ring is optimized.

3. A molded ring fan having improved outer ring strength, the molded ring fan comprising:

an inner ring;

a plurality of blades disposed circumferentially about said inner ring, each of said plurality of blades having a root and a blade tip; and an outer ring disposed circumferentially about said plurality of blades, wherein each of said roots is flowingly coupled with said inner ring and wherein each of said blade tips is flowingly coupled to said outer ring, said outer ring having a thickened region along its length between at least one of an adjacent pair of said plurality of blades, wherein said thickened region is characterized such that molten raw material introduced while forming the molded ring fan and flowing from one of said blade tips to said thickened region in the form of a first flow front does not substantially directly collide at a 180 degree angle with respect to molten raw material flowing from an adjacent blade tip to said thickened region in the form of a second flow front, wherein the thickness of said outer ring increases gradually and substantially uniformly from each respective one of an adjacent pair of blade tips of said plurality of fan blades toward a middle region.

* * * * *

UNITED STATES PATENT AND TRADEMARK OFFICE
CERTIFICATE OF CORRECTION

| | |
|---|---|
| PATENT NO. | : 7,168,922 B2 |
| APPLICATION NO. | : 10/831789 |
| DATED | : January 30, 2007 |
| INVENTOR(S) | : Jonathan B. Stagg and Donald E. Buckley |

It is certified that error appears in the above-identified patent and that said Letters Patent is hereby corrected as shown below:

In the Claims:

Claim 1:
Column 7, Line 9, should read as follows: --said second quantity of molten raw material flows--

Column 7, Line 12, should read as follows: --adjacent pair of the plurality of fan blades in substan--

Column 7, Line 17, should read as follows: --adjacent pair of fan blades in substantially a fourth--

Signed and Sealed this

Twenty-fourth Day of July, 2007

JON W. DUDAS
*Director of the United States Patent and Trademark Office*